(12) United States Patent
Fulkerson et al.

(10) Patent No.: US 9,110,841 B1
(45) Date of Patent: Aug. 18, 2015

(54) OVERLAP DETECTION USING BITMASK REGION TRACKERS

(71) Applicant: Seagate Technology LLC, Cupertino, CA (US)

(72) Inventors: Christopher Ryan Fulkerson, Longmont, CO (US); Abhay Tejmal Kataria, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 299 days.

(21) Appl. No.: 13/866,157

(22) Filed: Apr. 19, 2013

Related U.S. Application Data (60) Provisional application No. 61/788,587, filed on Mar. 15, 2013.

(51) Int. Cl.
| G06F 11/00 | (2006.01) |
| G06F 11/14 | (2006.01) |
| G06F 11/07 | (2006.01) |
| G11B 20/18 | (2006.01) |

(52) U.S. Cl.
CPC .............. G06F 11/14 (2013.01); *G06F 11/076* (2013.01); *G11B 2020/1869* (2013.01)

(58) Field of Classification Search
CPC . G06F 11/008; G06F 11/076; G06F 11/0793; G06F 11/22; G06F 11/3034; G11B 19/04; G11B 19/041; G11B 19/045; G11B 19/048; G11B 20/18; G11B 20/1816; G11B 20/1889; G11B 2020/1869
See application file for complete search history.

(56) References Cited

U.S. PATENT DOCUMENTS

| 5,813,000 | A | 9/1998 | Furlani |
| 7,463,441 | B2 * | 12/2008 | Cho et al. ................. 360/60 |
| 7,747,907 | B2 * | 6/2010 | Olds et al. ............... 714/54 |
| 7,783,046 | B1 | 8/2010 | Sklyarov |
| 8,010,807 | B2 | 8/2011 | Chrisop |
| 8,014,097 | B1 * | 9/2011 | Sanvido ................... 360/60 |
| 8,331,053 | B2 * | 12/2012 | Hobbet ..................... 360/60 |
| 8,806,117 | B2 * | 8/2014 | Islam et al. ............. 711/106 |
| 2001/0025343 | A1 | 9/2001 | Chrisop |
| 2004/0017629 | A1 * | 1/2004 | Lamberts et al. ....... 360/53 |
| 2012/0014013 | A1 * | 1/2012 | Bandic et al. .......... 360/60 |
| 2014/0071559 | A1 * | 3/2014 | Toda et al. .............. 360/55 |

* cited by examiner

*Primary Examiner* — Marc Duncan
(74) *Attorney, Agent, or Firm* — Cesari & Reed LLP; Kirk A. Cesari; Christian W. Best (57) ABSTRACT

Systems and methods are disclosed for overlap detection using bitmask region trackers. In an embodiment, an apparatus may comprise a controller configured to maintain a count of writes associated with a selected area of a data storage medium, generate an overlap check bitmask, including an overlap check bit for each of multiple regions of the selected area and that represent an indication of a previous write associated with a respective region from the multiple regions, generate a write check bitmask based on a received write, the write check bitmask including a write check bit for each of the multiple regions of the selected area and representing which of the multiple regions are related to the received write, and increment the count of writes based on comparing the overlap check bitmask with the write check bitmask.

20 Claims, 6 Drawing Sheets

OVERLAP DETECTION USING BITMASK REGION TRACKERS

BACKGROUND

For magnetic storage media drives, the magnetic field of a writer element of a head can impact the data stored on adjacent tracks to the target write track. It may be advantageous to periodically perform a directed offline scan (DOS), for example by checking for data quality degradation on a track and rewriting that track if degradation is found. Methods, systems, and apparatuses for determining when to initiate a DOS are needed.

SUMMARY

An apparatus may comprise a controller configured to maintain a count of writes associated with a selected area of a data storage medium, generate an overlap check bitmask indicating a previous write associated with a respective region from multiple regions of the selected area, generate a write check bitmask based on a received write indicating which of the multiple regions are related to the received write, and increment the count of writes based on comparing the overlap check bitmask with the write check bitmask.

In another embodiment, a device may comprise a nonvolatile memory including a plurality of storage areas designated as scan units, a scan unit including a plurality of regions, and a processor. The processor may be configured to maintain a count of writes associated with a selected scan unit of the nonvolatile memory, generate an overlap check bitmask, including an overlap check bit for each region of the plurality of regions of the selected scan unit, and the overlap check bitmask representing an indication of a previous write associated with a respective region from the plurality of regions, generate a write check bitmask based on a received write, the write check bitmask including a write check bit for each region of the plurality of regions of the selected scan unit, and the write check bitmask representing which of the plurality of regions are related to the received write; and increment the count of writes based on comparing the overlap check bitmask with the write check bitmask.

In another embodiment a controller may be configured to generate an overlap check bitmask indicating a previous write associated with a respective region from multiple regions of a selected area of a data storage medium, receive a write command, generate a write check bitmask based on the write command indicating which of the multiple regions are related to the write command, perform a logical AND operation with the write check bitmask and the overlap check bitmask, when the output of the logical AND operation is zero, set the output of a logical OR operation between the write check bitmask and the overlap check bitmask to be a new overlap check bitmask for the selected area, when the output of the logical AND operation is nonzero, increment a count of writes associated with the selected area, and set the output of the logical AND operation as the new overlap check bitmask for the selected area.

DETAILED DESCRIPTION

Figure 1:
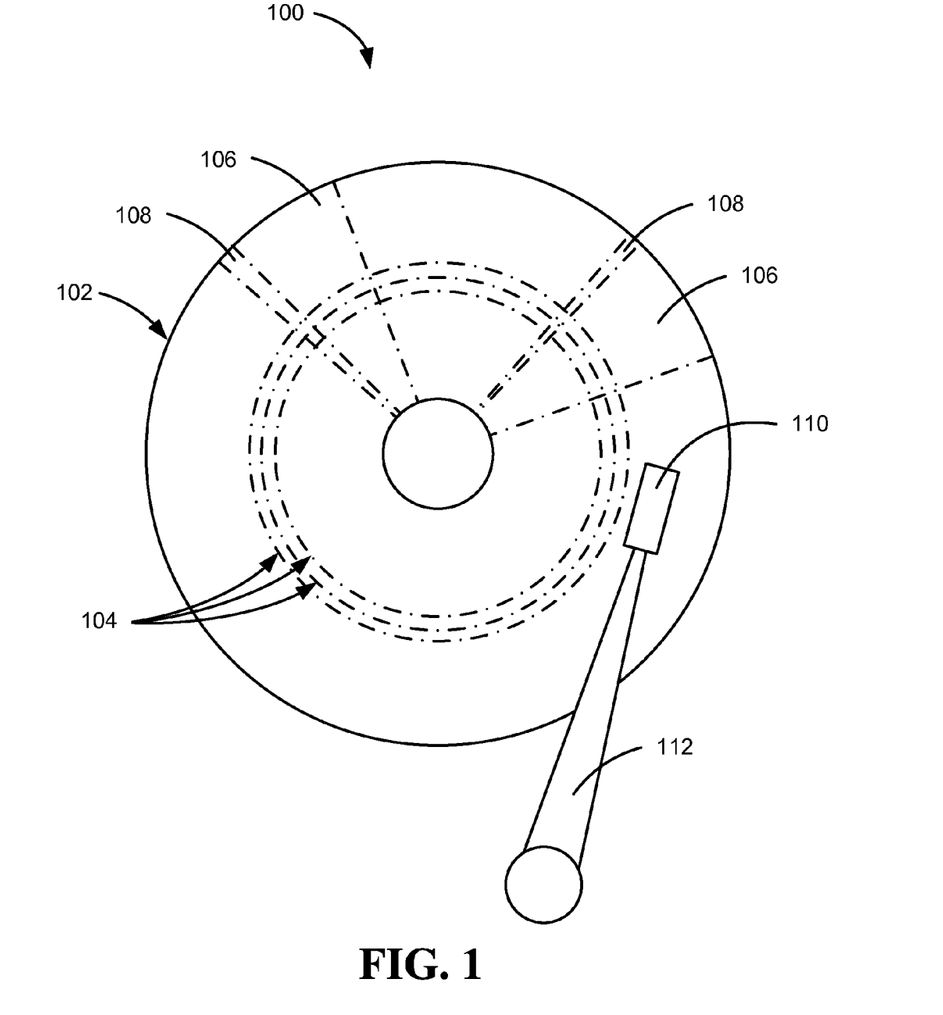
FIG. 1 is a diagram of an illustrative embodiment of a system for overlap detection using bitmask region trackers.

FIG. 1 depicts a diagram of an illustrative embodiment of a system for overlap detection using bitmask region trackers, generally designated 100. A data storage device, such as a hard disc drive, laptop computer, or other device, may have one or more discs 102 having tracks 104 for storing data. Each track 104 may be further divided into a number of sectors, such as wedge-shaped sectors 106, for storing data along the length of the track 104. Data may be recorded to the sectors 106 of the tracks by a writer element of a head 110 (sometimes called a write head) generating a magnetic field, the magnetic field used to change the values of bits stored within the sectors 106.

Specific data or locations on a disc 102 can be identified with a sector identification ("sector ID") or sector number, and a track identification ("track ID") or track address. This sector ID and track ID can be part of the servo data used to position an arm 112 having the read/write head 110 over the disc 102. A section 108 of each sector 106 may be devoted to store this servo data, while the remainder of the sector 106 may be used to store other data, such as user or system data. During operation, as the disc 102 spins, the head 110 can read the servo data 108 and use such data to move the arm 112 to position the head 110 over specific tracks 104. The data storage device may then read or write data to the disc 102 via the head 110.

As disc drive areal density increases, achieving the desired reliability at the target track spacing becomes more challenging due to possible imperfections in the shape of the magnetic field created by the writer element in the head 110. When the drive performs repeated writes at the same location, the stray field generated by these imperfections may result in a gradual erasure of nearby tracks, due to effects such as adjacent track interference (ATI) or side track erasure (STE). ATI may refer to the stray field of a write head 110 affecting tracks 104 adjacent to the target write track. STE may refer to flaws in a write head's 110 shape causing erasure to more distant tracks 104 without necessarily affecting the tracks 104 in between. In order to mitigate these erasure effects, tracks 104 can be periodically refreshed (e.g. rewritten) when a pre-determined number of repeated writes have occurred to nearby tracks 104.

Refreshing a track 104 can be accomplished by performing a directed offline scan (DOS) on the track 104 once the threshold number of writes to nearby tracks 104 has been reached. A DOS may involve reading the track 104, for example with a reader element of the head 110, using a lower error correction tolerance than during normal read operations. When tracks 104 are read during normal read operations, some errors can be detected and corrected. By reading tracks 104 using a lower error tolerance, degradation of the data on a track 104 can be detected before the data becomes unreadable at the normal error correction tolerance.

If the track 104 is still readable with the lower tolerance, the data quality for the track 104 may not have degraded enough to warrant rewriting. If the track 104 produces errors with the lower error tolerance, the DOS may involve reading the track 104 and applying error correction techniques, then rewriting the track 104 to refresh the data quality. Performing DOS scanning and rewriting requires drive resources, so it may be beneficial to a drive's performance to accurately track data writes for the DOS write counter, and only perform DOS writes when it is likely that a track 104 needs to be refreshed.

Figure 2:
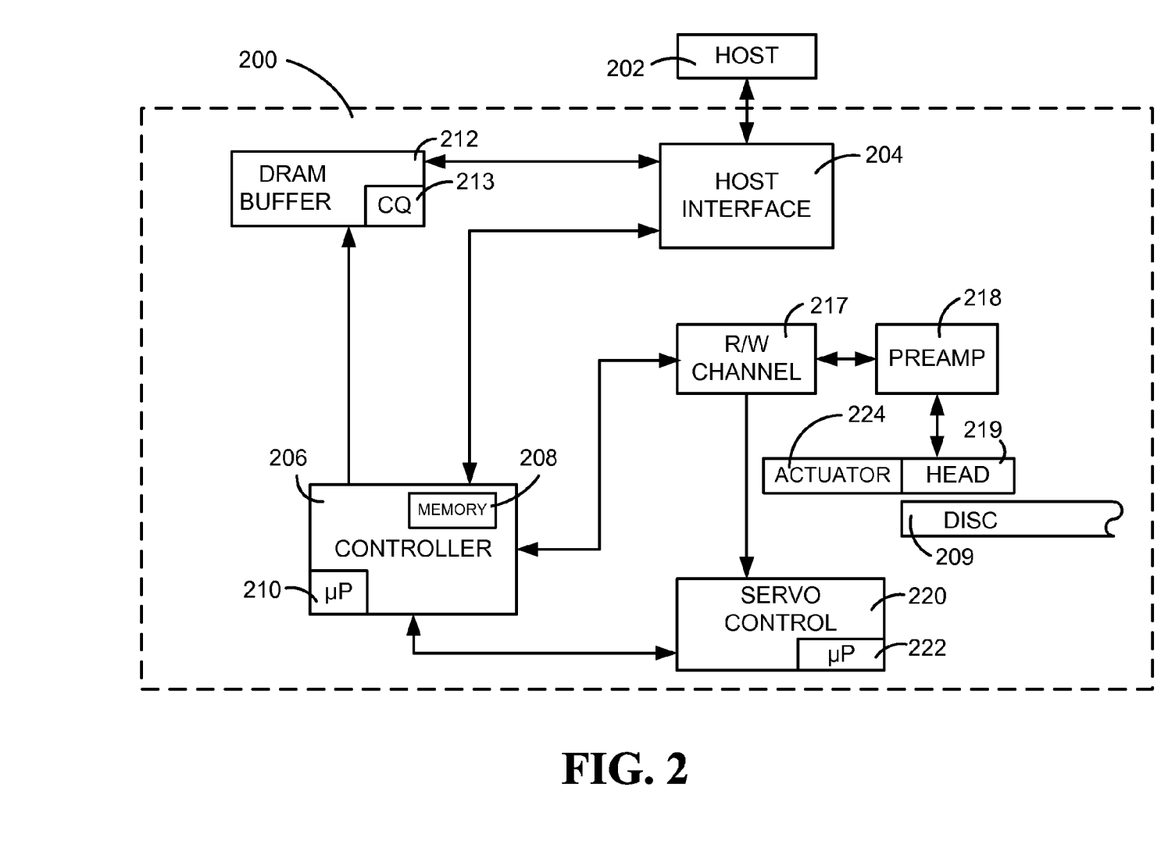
FIG. 2 is a diagram of an another illustrative embodiment of a system for overlap detection using bitmask region trackers.

FIG. 2 depicts a diagram of an illustrative embodiment of a system for overlap detection using bitmask region trackers, generally designated 200. Specifically, FIG. 2 provides a functional block diagram of a data storage device (DSD). The DSD 200 can be a desktop computer, a laptop computer, a server, a personal digital assistant (PDA), a telephone, a music player, any other device which may be used to store or retrieve data, or any combination thereof. The DSD 200 can optionally connect to and be removable from a host device 202, which can similarly be a desktop computer, a laptop computer, a server, a personal digital assistant (PDA), a telephone, a music player, another electronic device, or any combination thereof. The data storage device 200 can communicate with the host device 202 via a hardware/firmware based host interface circuit 204 that may include a connector (not shown) that allows the DSD 200 to be physically removed from the host 202.

The DSD 200 can include a programmable controller 206 with associated memory 208 and processor 210. A buffer 212 can temporarily store user data during read and write operations and can include a command queue (CQ) 213 where multiple pending access operations can be temporarily stored pending execution. Further, FIG. 2 shows the DSD 200 can include a read/write (R/W) channel 217, which can encode data during write operations and reconstruct user data retrieved from disc(s) 209 during read operations. A preamplifier/driver circuit (preamp) 218 can apply write currents to the head(s) 219 and provides pre-amplification of readback signals. A servo control circuit 220 may use servo data to provide the appropriate current to the actuator 224 to position the head(s) 219 over the disc(s) 209. The controller 206 can communicate with a processor 222 to move the head(s) 219 to the desired locations on the disc(s) 209 during execution of various pending commands in the command queue 213.

Information on write counts for DOS can be stored on volatile or nonvolatile memory, such as the memory 208, DRAM 212, Disc 209, other memories like nonvolatile Flash, or a combination thereof. Write counts may be tracked by a circuit, processor, or other device, such as the controller 206. When a DOS write count threshold is exceeded, the controller 206 may direct data to be read from the disc 209 and checked for errors to determine whether to refresh the data.

Managing the counts of accumulated writes may require a balance between performance and memory utilization. For example, write counts can be maintained on a multi-track or zone level, which would not require large amounts of memory. However, that may result in incrementing the write counter for an entire set of tracks when only a sector or two of the tracks may have been affected by a nearby write. Writes to a few scattered sectors can cause the write count for the set of tracks to increase repeatedly, while the actual degradation of any particular area of the tracks would be minimal.

Figure 3:
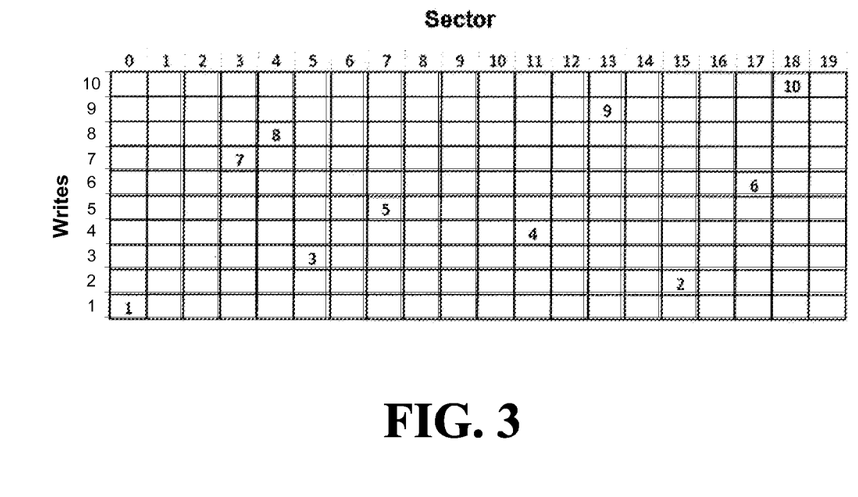
FIG. 3 is a chart of an example series of write commands to a region of memory.

As an example, FIG. 3 depicts a chart of an embodiment where write count is tracked for a set of 20 sectors on a track, numbered 0-19. A sequence of 10 writes is shown in the chart. The DOS threshold may be set to 10, because 10 writes impacting a single sector may require the sector to be rewritten, but the write count tracking granularity may be set to 20 sectors to conserve memory. Therefore, the write count may be incremented whenever a write may impact any one of the 20 sectors, and therefore may be incremented once for each of the 10 displayed writes. In the example depicted, none of the 10 writes impact the same sector more than once, and yet the threshold of 10 is reached. It is very unlikely that any of the sectors will need to be rewritten under this example, and yet the sectors may end up being read to check for errors anyway. This may introduce inefficiency into the drive performance.

Increasing the granularity of the write count accounting may reduce the performance impact that occurs due to overscanning (e.g. scanning of tracks or sectors that have not experienced significant actual ATI or STE). As such, track level granularity may be superior to a multi-track zone level granularity. Even superior efficiency may be achieved with sector level granularity. However, to achieve that level of efficiency may require enough memory to store a count for every sector on the drive, which may exceed available memory in some data storage devices.

One method to reduce overscanning while minimizing the additional memory utilization may be to maintain a write count at a scan unit granularity. A scan unit may be comprised of one or more tracks. Each scan unit may be further subdivided into regions. The number of regions per scan unit may be the lesser of the number of sectors on a single track and the number of bits of memory available per scan unit. Available bits per scan unit may be set by a manufacturer, by a user, automatically calculated by a device based on the amount of memory available, according to other settings, or any combination thereof. The bit assigned to each region may be used to indicate whether a given region could have reached the number of writes indicated by the scan unit write count. The collection of these bits for a given scan unit may be referred to as an Overlap Check Mask (OCM). In order to avoid the need to store the OCM persistently, the mask for all regions for all scan units may be initialized to 1's on power up of the data storage device, while the current write count may be stored to nonvolatile memory. Initializing the OCM to all 1's accounts for the possibility that any given region may have the most writes according to the current write count. After performing a DOS, the write count may be reset to 0 and the OCM may be set all 0's.

Figure 4:
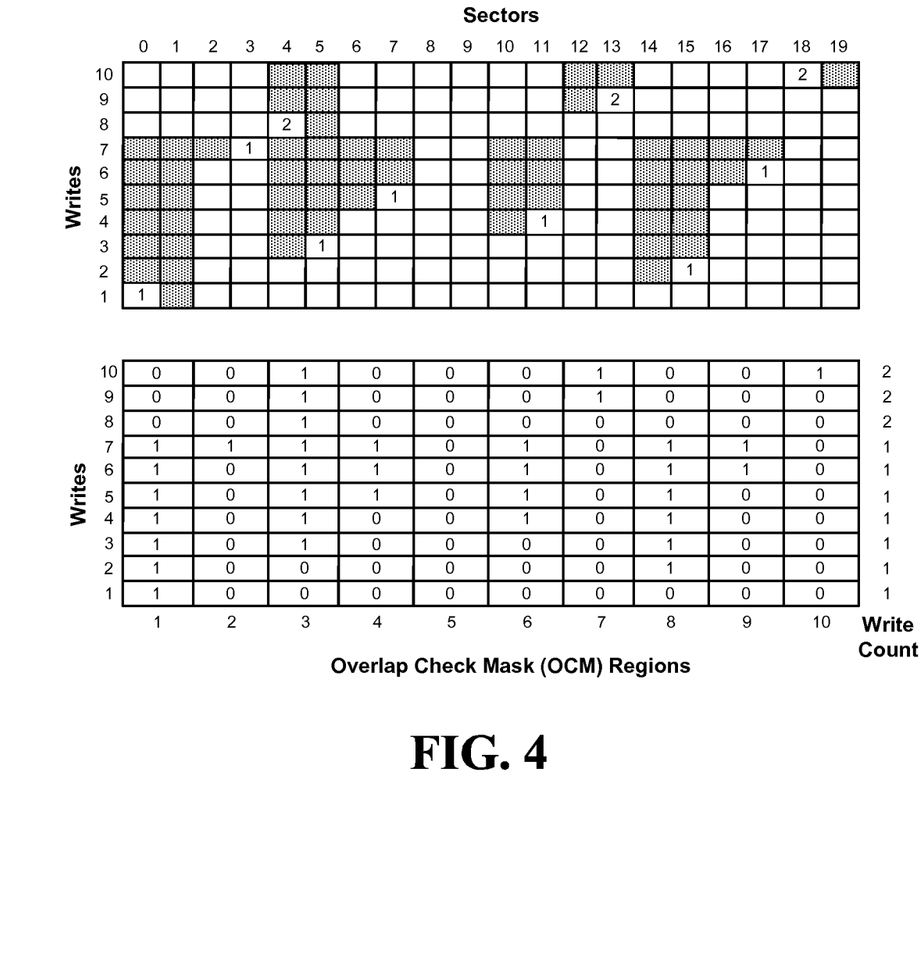
FIG. 4 is a diagram of an illustrative embodiment of a system for overlap detection using bitmask region trackers.

Turning now to FIG. 4, a chart is depicted showing an example embodiment of a system using overlap detection using bitmask region trackers. In the embodiment of FIG. 4, a scan unit comprising 10 regions is depicted, and each region may contain 2 sectors. The top chart shows a series of 10 writes to the scan unit spread across 20 sectors. Each row may indicate a write operation affecting the scan unit, with the bottom row being the first write operation and the top row being the last write operation. Numbered blocks may represent written sectors, with the number indicating the current write count for the scan unit. Shaded blocks may indicate the Overlap Check Mask (OCM) bitmask of accessed sectors for the current write count. More specifically, shaded blocks may indicate 1's on the OCM, while empty blocks may indicate 0's.

The OCM is depicted in the bottom chart of FIG. 4. Each row may show the current OCM after the given write operation, with the current write count shown in the right-most column. The 1's in the bottom chart may correspond to the shaded blocks in the top chart, and the 0's in the bottom chart may correspond to the empty blocks of the top chart. In embodiments where the number of regions in a scan unit is based on the number of bits available rather than the number of sectors on a track, multiple sectors may be represented by a single bit. For example, the scan unit depicted in FIG. 4 may comprise 20 sectors, but the OCM for the scan unit may only be 10 bits. In this example, each of the 10 scan unit regions may comprise 2 sectors. A write influencing either of the sectors within a region may simply counted as a write affecting that region, or in other words the write may be counted as having affected both sectors in the region. For example, if a region contains sectors 0 and 1 as shown in FIG. 4, for purposes of the Overlap Check Mask a write to sector 0 is treated the same as a write to sector 1.

In another example embodiment, a track may have 20 sectors, but only 9 bits per scan unit. In such an embodiment the first 8 regions may comprise 2 sectors each, while the final region may comprise 4 sectors. In another embodiment, two regions may contain 3 sectors, while the other 7 regions contain 2 sectors each. Other embodiments are also possible.

As discussed herein, writing to track 2 may cause overlap or interference with adjacent tracks 1 and 3, for example. DOS write counts for scan units of tracks 1 and 3 may be incremented when track 1 is written. When a write occurs that shares some overlap with a scan unit, a bit mask can be calculated for the scan unit reflecting which regions are being affected. This calculated bit mask may be referred to as a Write Check Mask (WCM). So for example, if a scan unit contains five regions, the first two of which may be overlapped by a nearby write, the WCM may be 1 1 0 0 0. The write count for a scan unit may only get incremented when a new write overlaps with a region that was previously accessed. When a new write does not overlap the current OCM bitmask, the write count may stay the same and the new write can be OR'ed into the OCM bitmask.

In an example, a Write Check Mask can be calculated based on a write command. The Write Check Mask can be logically AND'ed with the Overlap Check Mask to check if a newly affected sector matches a previously affected sector. If the AND result is zero, (i.e. if the WCM and the OCM do not share any 1's for the same region), then the newly impacted regions (i.e. the 1's of the WCM) can be updated in the Overlap Check Mask by OR'ing in the Write Check Mask. The result of this can obtain an OCM with 1's for all regions that were just impacted according to the WCM, as well as 1's for any regions that reflected a 1 prior to the logical OR operation.

To use the example of FIG. 4, a WCM may be generated for write number 2, and compared against the OCM currently existing after write number 1 using a logical AND operation:
 1 0 0 0 0 0 0 0 0 0 OCM after write 1
 0 0 0 0 0 0 0 1 0 0 WCM for write 2
In this example, the 1 of the write check mask does not overlap a 1 of the overlap check mask. The results of ANDing these two bitmasks may produce a 0 result. In this example, the write count may remain at 1, and the OCM and the WCM may be OR'ed together to generate the new OCM:
 1 0 0 0 0 0 0 1 0 0 OCM after write 2
If the result of the AND operation between the OCM and WCM is nonzero (i.e. if the WCM and the OCM both had a 1 in the same region), then the write count for this scan unit can be incremented and the Overlap Check Mask can be set to the AND result. That is, the OCM may now only have a 1 for regions where both the OCM and the WCM had a 1. In this way, the write count for a scan unit may only increase if a write potentially overlaps with a prior write.

Returning to the example of FIG. 4, a WCM may be generated for write number 8, and compared against the OCM currently existing after write number 7 using a logical AND operation:
 1 1 1 1 0 1 0 1 1 0 OCM after write 7
 0 0 1 0 0 0 0 0 0 0 WCM for write 8
In this example, the 1 of the write check mask does overlap a 1 of the overlap check mask, and the results of ANDing these two bitmasks may produce a non-zero result. In this example, the write count may be incremented to 2, and the OCM may be set to the results of the AND operation as follows:
 0 0 1 0 0 0 0 0 0 0 OCM after write 8

Storing the AND result to the Overlap Check Mask when the write count increases can further reduce the overscan penalty. This is because all the sectors that were not both affected by the most recent write and in the same region as a prior write are set to 0's, because they have at least one less write than the total write count. That is, regions that are common to both masks may have at least one more write than their peers and are thus the regions that must be reflected in the new Overlap Check Mask.

According to the OCM and write count approach, any given region in a scan unit may not have been overlapped the same number of times as the write count. That is, two consecutive writes to region 1 may increment the write counter to 2, and then three consecutive writes to region 2 may increment the write count to four, even though no region may have 4 writes. Nevertheless, using an OCM in conjunction with a write count can guarantee no region has been written more times than the write count, while greatly reducing the likelihood of a DOS threshold being reached with minimal actual overlap to the regions.

To give an example using a 5-region scan unit, the Overlap Check Mask may start at 1 1 1 1 1 with a write count of 0. A write command may generate a Write Check Mask of 0 1 1 0 0. The two masks can be AND'ed together, resulting in 0 1 1 0 0. Since this is a non-zero result, the write count may be increased to 1 and the OCM becomes the AND result of 0 1 1 0 0. A new write generates a WCM of 0 0 0 0 1. The OCM and WCM are AND'ed together, resulting in 0 0 0 0 0. Since this is a zero result, the new OCM becomes the result of OR'ing together the current OCM and the WCM, resulting in a new OCM of 0 1 1 0 1, and the write count remains at 1. Finally, another write is received with a WCM of 0 0 1 1 0. AND'ing the OCM and WCM together results in 0 0 1 0 0. This is nonzero again, so the write count is incremented to 2, and the new OCM becomes the AND result of 0 0 1 0 0. These examples are for illustration purposes only, and it should be understood that much larger numbers of regions may be used, which could improve the efficiency of the disclosed method.

For write workloads where the written block count is low relative to the number of sectors per scan unit, the bitmask implementation can realize a significant increase in writes per scan. The gains can also scale based on the amount of memory available, which can result in a highly scalable solution that can address the needs of different market segments.

In some embodiments, the bitmask-based write counts can also be applied to multi-track scan units by projecting the individual sectors into regions based on their rotational position on the media. For example, a write at physical sector zero on the first track of a scan unit would increment the same region as a write at physical sector zero on the second track of the same scan unit. In some embodiments, the regions of the Overlap Check Mask represent all radially aligned sectors of the tracks of the scan units. In such embodiments, the process of AND'ing and OR'ing the OCM and WCM would operate the same, regardless of whether a write influenced track 1 of region 1 or track 5 of region 1.

Figure 5:
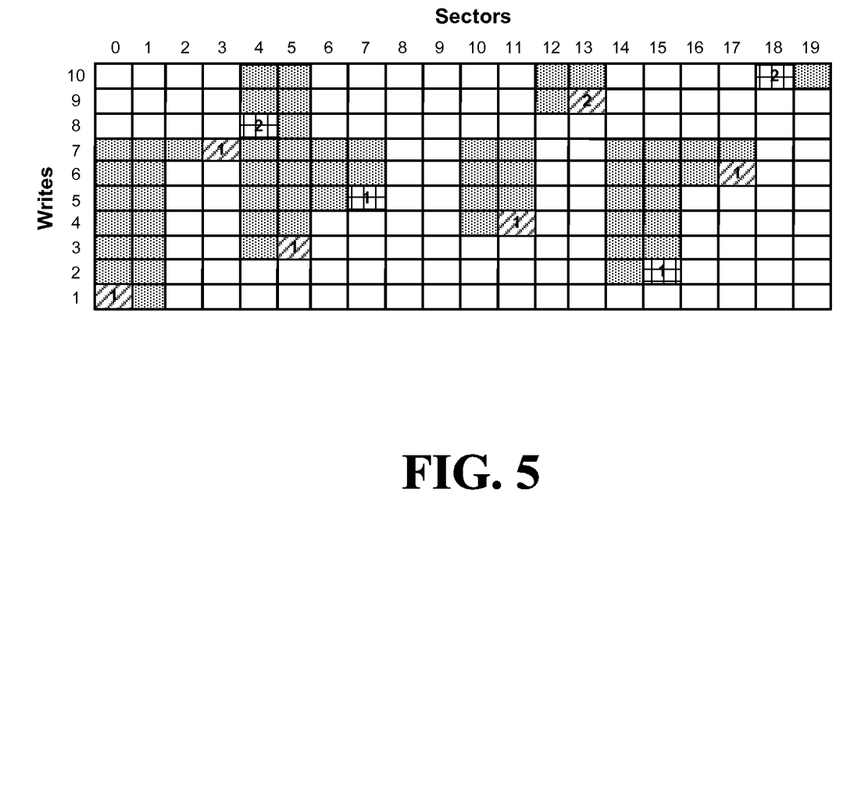
FIG. 5 is a diagram of an another illustrative embodiment of a system for overlap detection using bitmask region trackers.

Turning now to FIG. 5, a chart is depicted showing an example embodiment of a system using overlap detection using bitmask region trackers. In the depicted embodiment, the scan unit may comprise 20 radially-aligned sectors on two adjacent tracks.

As with the embodiment of FIG. 4, a scan unit of FIG. 5 may comprise 10 regions, with each region containing 2 sectors of the two adjacent tracks. The chart may show a series of 10 writes to the scan unit spread across the two tracks and 20 sectors. Each row may indicate a write operation affecting the scan unit, with the bottom row being the first write operation and the top row being the last write operation. Numbered blocks may represent written sectors, with the number indicating the current write count for the scan unit. Unlike FIG. 4, striped blocks may indicate a write to the depicted sector of the first track, and hashed blocks may indicate a write to the depicted sector of the second track. Shaded blocks may once again indicate the Overlap Check Mask (OCM) bitmask of accessed sectors for the current write count. As can be seen from FIG. 5, the functioning of the bitmask may be the same for a multi-track scan unit as for a single-track scan unit, with a write affecting sector 0 or 1 of either track being reflected on the OCM the same way as a write affecting sector 0 or 1 of a single-track would be reflected on the OCM.

Aligning sectors by physical alignment on a disc can account for magnetic field interference based on physical location of the head. Grouping logical sectors in scan units may not accurately capture magnetic flux effects.

Figure 6:
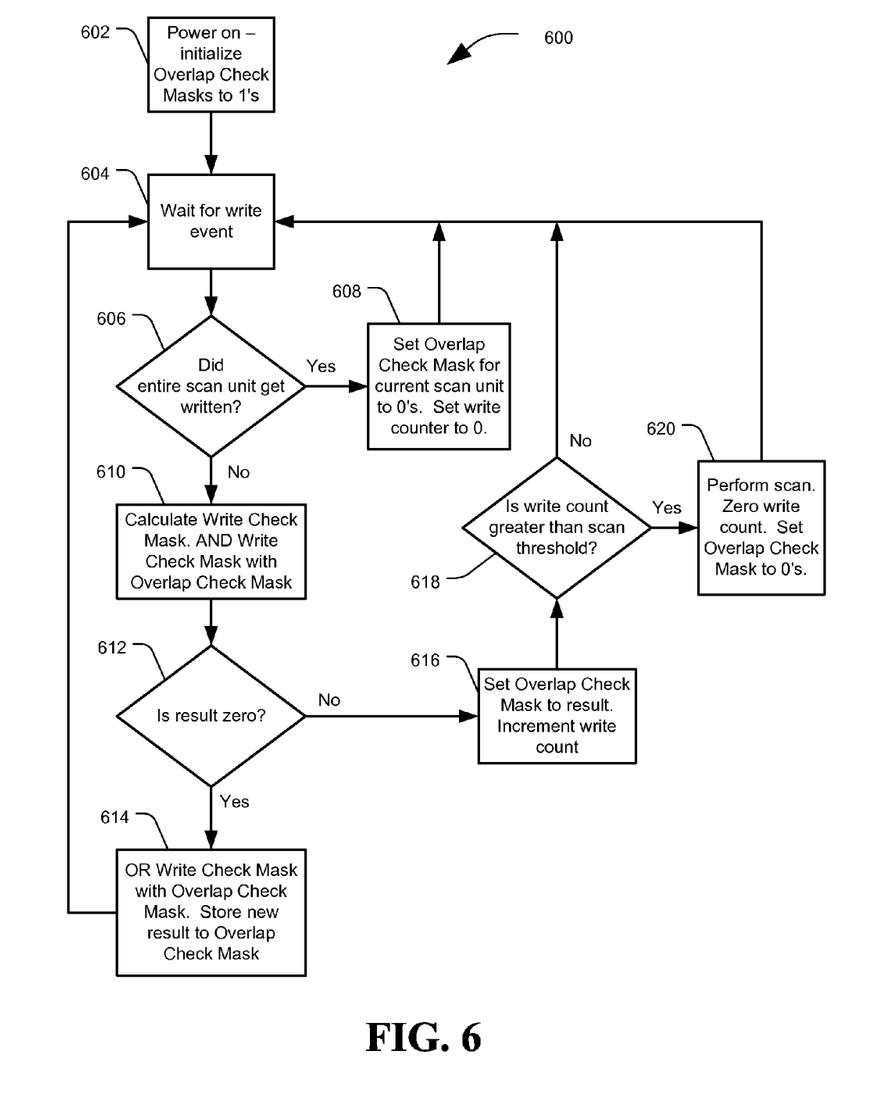
FIG. 6 is a flowchart of an illustrative embodiment of a method for overlap detection using bitmask region trackers.

Turning now to FIG. 6, a flowchart of an example embodiment of a method for overlap detection using bitmask region trackers is depicted and generally designated 600. At 602 the method 600 may involve powering on a device employing overlap detection using bitmask region trackers, and initializing the overlap check masks for scan units to all 1's. In some embodiments, OCMs may be stored in nonvolatile memory, and the most recent OCMs may be loaded without setting the bits to 1's.

The method 600 may next involve waiting for a write event, at 604. When a write event is received, it may be determined whether an entire scan unit has been written by the write event, at 606. That is, if the write event requires writing the entire scan unit, the scan unit has in effect been "refreshed" by the write event. If the entire scan unit was written at 606, the method 600 may involve setting the OCM for the current scan unit to all 0's, and setting the write count to 0, indicating that no region of the scan unit has been affected by nearby writes. The method 600 may return to waiting for write events, at 604.

Of the entire scan unit wasn't written, at 606, the method 600 may next involve calculating a Write Check Mask for any regions of the scan unit affected by the write event, at 610. The method 600 may also involve performing a logical AND operation with the OCM for the scan unit and the new WCM, at 610. It may be determined whether the result of the AND operation is zero, at 612.

If the AND result is zero, at 612, the method 600 may involve performing a logical OR operation between the OCM and the WCM, and storing the result as the new OCM for the scan unit, at 614. The method 600 may then return to waiting for write events, at 604.

If the AND result is nonzero, at 612, the method 600 may involve setting the OCM to the result of the AND operation, and incrementing the write count for the scan unit, at 616. The write count may then be compared against a scan threshold, at 618. If the write count is not greater than the threshold, the method 600 may return to waiting for write events, at 604. If the write count is greater than the scan threshold, the method 600 may involve performing a scan on the scan unit (including rewriting data from the scan unit if errors are detected), setting the write count to 0, and setting the OCM to all 0's, at 620. This may indicate that, whether or not errors were detected, the scan unit has been scanned and counting writes for potential overlaps may be restarted. The method 600 may then return to waiting for write events, at 604.

In the preceding detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. While the description herein focuses on disc-based storage media, the systems and methods can be applied to any storage media where data quality can become degraded or for other reasons, such as Flash memory.

In accordance with various embodiments, the methods described herein may be implemented as one or more software programs running on a computer processor or controller device. In accordance with another embodiment, the methods described herein may be implemented as one or more software programs running on a computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device storing instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a controller configured to:
        maintain a count of writes associated with a selected area of a data storage medium;
        generate an overlap check bitmask indicating a previous write associated with a respective region from multiple regions of the selected area;
        generate a write check bitmask based on a received write indicating which of the multiple regions are related to the received write; and
        increment the count of writes based on comparing the overlap check bitmask with the write check bitmask.

2. The apparatus of claim 1 further comprising the overlap check bitmask represents an indication of previous writes associated with respective regions since a last time the count of writes was incremented.

3. The apparatus of claim 2 comprising the controller further configured to:
store the count of writes to a nonvolatile memory; and
store the overlap check bitmask to a volatile memory.

4. The apparatus of claim 3 comprising the controller further configured to:
set the overlap check bitmask to a bit value of one for each overlap check bit on a power-on event.

5. The apparatus of claim 1 further comprising:
a number of regions in the multiple regions is the lesser of a number of sectors on a track of the data storage medium and a number of bits of memory available to the overlap check bitmask.

6. The apparatus of claim 5 further comprising:
the number of bits of memory available may be set by a manufacturer, set by a user, or automatically calculated by a device including the data storage medium based on an amount of memory available on the device and a number of selected areas on the data storage medium.

7. The apparatus of claim 1 comprising the controller further configured to:
receive the received write;
perform a logical AND operation with the write check bitmask and the overlap check bitmask;
when the output of the logical AND operation is zero, set the output of a logical OR operation between the write check bitmask and the overlap check bitmask to be a new overlap check bitmask for the selected area;
when the output of the logical AND operation is nonzero, increment the count of writes; and
set the output of the logical AND operation as the new overlap check bitmask for the selected area.

8. The apparatus of claim 7 comprising the controller further configured to:
set the overlap check bitmask to a bit value of zero for each overlap check bit and reset the count of writes when the received write involves writing data to each of the multiple regions of the selected area.

9. The apparatus of claim 1 comprising the controller further configured to:
when the count of writes exceeds a threshold:
reset the count of writes;
set the overlap check bitmask to a bit value of zero for each overlap check bit; and
perform a rewrite scan on the selected area.

10. The apparatus of claim 9 further comprising the rewrite scan including:
reading data from the selected area;
determining whether an amount of errors detected when reading the data exceeds an error tolerance; and
correcting errors and rewriting the data to the selected area when the amount of errors exceeds to the error tolerance.

11. The apparatus of claim 1 further comprising:
the data storage medium includes a disc memory; and
the selected area includes a plurality of tracks of the disc memory.

12. A device comprising:
a nonvolatile memory including a plurality of storage areas designated as scan units, a scan unit including a plurality of regions;
a processor configured to:
maintain a count of writes associated with a selected scan unit of the nonvolatile memory;
generate an overlap check bitmask, including an overlap check bit for each region of the plurality of regions of the selected scan unit, and the overlap check bitmask representing an indication of a previous write associated with a respective region from the plurality of regions;
generate a write check bitmask based on a received write, the write check bitmask including a write check bit for each region of the plurality of regions of the selected scan unit, and the write check bitmask representing which of the plurality of regions are related to the received write; and
increment the count of writes based on comparing the overlap check bitmask with the write check bitmask.

13. The device of claim 12 further comprising the overlap check bitmask represents an indication of previous writes associated with respective regions since a last time the count of writes was incremented.

14. The device of claim 12 comprising the processor further configured to:
receive the received write;
perform a logical AND operation with the write check bitmask and the overlap check bitmask;
when the output of the logical AND operation is zero, set the output of a logical OR operation between the write check bitmask and the overlap check bitmask to be a new overlap check bitmask for the selected scan unit;
when the output of the logical AND operation is nonzero, increment the count of writes; and
set the output of the logical AND operation as the new overlap check bitmask for the selected scan unit.

15. The device of claim 14 comprising the processor further configured to:
when the count of writes exceeds a rewrite scan threshold:
reset the count of writes;
set the overlap check bitmask to a bit value of zero for each overlap check bit; and
perform a rewrite scan on the selected scan unit.

16. The device of claim 15 further comprising the rewrite scan including:
reading data from the selected scan unit;
determining whether an amount of errors detected when reading the data exceeds a set error tolerance that is lower than a standard error tolerance used when performing standard read commands; and
correcting errors and rewriting the data to the selected scan unit when the amount of errors exceeds to the set error tolerance.

17. The device of claim 12 further comprising:
the nonvolatile memory includes a disc memory;
a number of regions in the plurality of regions is the lesser of a number of sectors on a track of the disc memory and a number of bits of memory available to the overlap check bitmask; and
the number of bits of memory available may be set by a manufacturer, set by a user, or automatically calculated by the device based on an amount of memory available on the device and a number of scan units on the disc memory.

18. An apparatus comprising:
a controller configured to:
generate an overlap check bitmask indicating a previous write associated with a respective region from multiple regions of a selected area of a data storage medium;
receive a write command;
generate a write check bitmask based on the write command indicating which of the multiple regions are related to the write command;

perform a logical AND operation with the write check bitmask and the overlap check bitmask;

when the output of the logical AND operation is zero, set the output of a logical OR operation between the write check bitmask and the overlap check bitmask to be a new overlap check bitmask for the selected area;

when the output of the logical AND operation is non-zero, increment a count of writes associated with the selected area; and set the output of the logical AND operation as the new overlap check bitmask for the selected area.

19. The apparatus of claim 18 comprising the controller further configured to:

when the count of writes exceeds a threshold:

reset the count of writes;

set each bit of the overlap check bitmask to a bit value of zero;

perform a rewrite scan on the selected area including:

reading data from the selected area;

determining whether an amount of errors detected when reading the data exceeds an error tolerance; and correcting errors and rewriting the data to the selected area when the amount of errors exceeds to the error tolerance.

20. The apparatus of claim 18 further comprising:

the overlap check bitmask includes an overlap check bit for each region of the multiple regions; and the write check bitmask includes a write check bit for each region of the multiple regions and represents an indication of previous writes associated with respective regions since a last time the count of writes was incremented.

* * * * *